June 23, 1970  C. R. JUSTICE  3,516,202
PORTABLE VEHICLE OPERATED GATE

Filed Jan. 16, 1968  2 Sheets-Sheet 1

Charles R. Justice
INVENTOR.

BY

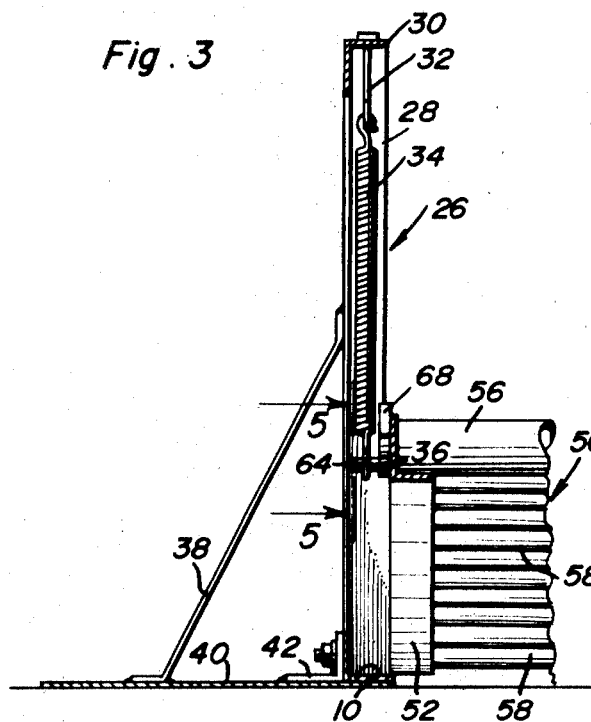
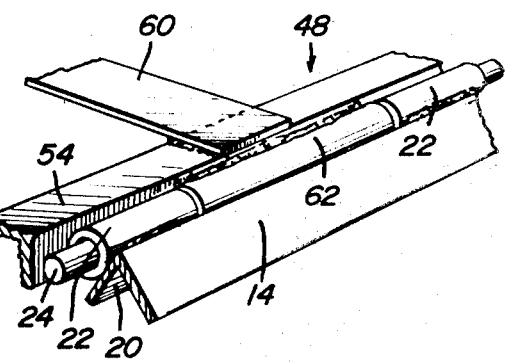
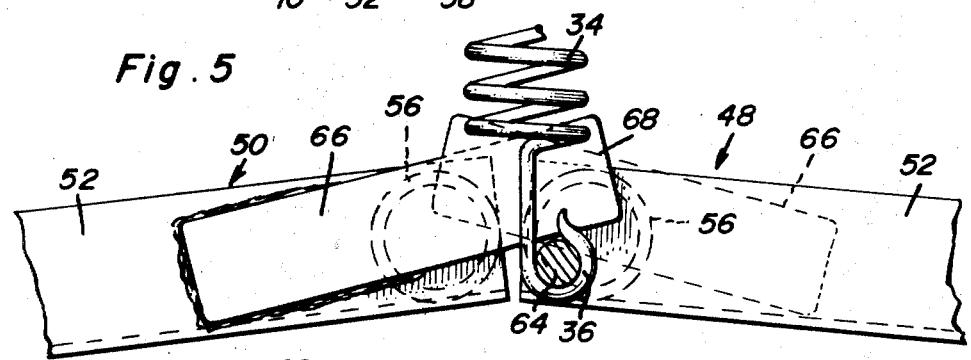
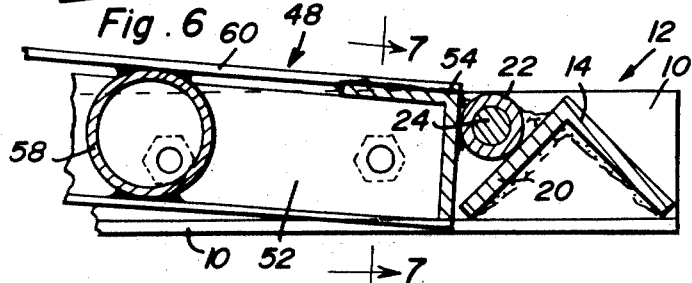
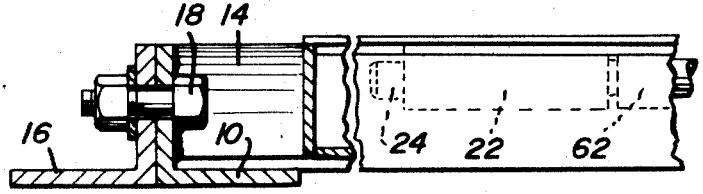

United States Patent Office 3,516,202
Patented June 23, 1970

3,516,202
PORTABLE VEHICLE OPERATED GATE
Charles R. Justice, 12 N. 41st St.,
Temple, Tex. 76501
Filed Jan. 16, 1968, Ser. No. 698,178
Int. Cl. E06b 11/04
U.S. Cl. 49—131                              2 Claims

ABSTRACT OF THE DISCLOSURE

This gate is portable and can be readily installed in a gateway leading to and from a fence-enclosed area. Interconnected side rails and end rails provide a sturdy base for a pair of hingedly mounted gates which have inward ends which are normally in converging elevated relationship between inverted U-shaped posts or uprights. These uprights have adjustable depending gate suspending springs. The gates prevent cattle from passing thereover but allow vehicles to ride thereover in either direction.

---

This invention relates to certain new and useful improvements in a prefabricated ready-to-install farm gate construction which, like certain prior patented gates, lends itself to feasible and practical use in a gateway in that it reliably blocks the passage of cattle but permits automobiles, trucks and farm machines to pass safely thereover and through the gateway at will and without undue hindrance.

It is common in the art of vehicle responsive gates to pivotally anchor openwork and grate-like upwardly and inwardly inclined platforms and gates on and within the encompassing limits of a generally rectangular base frame. Various structural arrangements have been devised to normally poise balanced paired gates in cattle blocking and guarding relationship and, alternatively, allow the gates to descend to level oriented relationship when a vehicle is driven properly over the gates. The cattle guard in the patent to Bauer 1,860,571 is a typical two-way adaptation and the load responsive gate shown in Rounsborg et al., Pat. 1,714,820, is a second citation generally indicative of the state of the art.

The object of the present venture is to provide an improved self-contained portable structure which is comparably simple, efficient, reliable and otherwise well adapted to serve the over-all purposes for which it has been perfected and repeatedly and successfully used.

Briefly summarized, the base means comprises a prefabricated rectangular frame made up of a first pair of angle irons providing companion side rails or sills and a pair of inverted V-irons which interconnect the ends of the angle irons and provide the desired end rails. The opposed vertical posts or uprights are inverted U-shaped in form and are joined at their lower ends to opposite median portions of the respective side rails. To the ends desired, these uprights are shored up and adequately stabilized by coordinated guy-rods and prop-like outside diagonal braces. Also, these uprights ideally support depending replaceable coil springs which in turn suspend and elevate the inward ends of the hingedly mounted outwardly and downwardly sloping drive-in and drive-out gates. For best results the gates each comprise a U-frame made up of angle irons and spaced parallel pipes or rods which are properly assembled and joined to their respectively cooperable angle irons. Other and more specific features will be hereinafter set forth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a view on an enlarged scale and fragmentarily shown and appearing in section and elevation and taken on the plane of the vertical section line 3—3 of FIG. 2.

FIG. 4 is a fragmentary perspective view showing the hinging means for a fragmentary end portion of one of the gates.

FIG. 5 is an enlarged fragmentary view taken approximately on the plane of the section line 5—5 of FIG. 3.

FIG. 6 is an enlarged detail section on the plane of the section line 6—6 of FIG. 1.

FIG. 7 is a view at right angles to FIG. 6 and taken approximately on the plane of the vertical section line 7—7 of FIG. 6.

Figure 1:
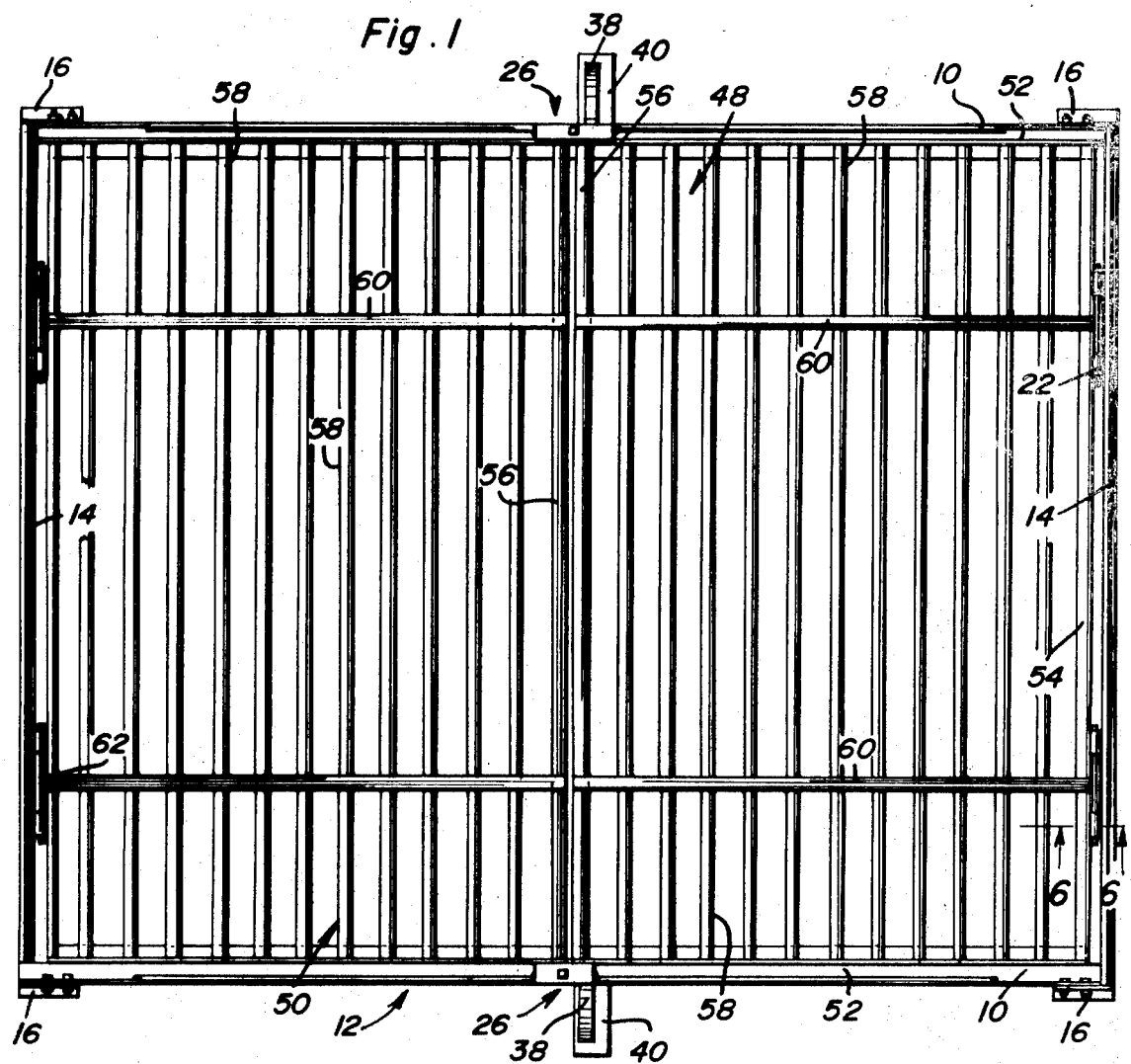
FIG. 1 is a top plan view of a portable vehicle operated gate constructed in accordance with the principles of the present invention and ready for installation in a gateway leading to and from an enclosed area (not shown).
Figure 2:
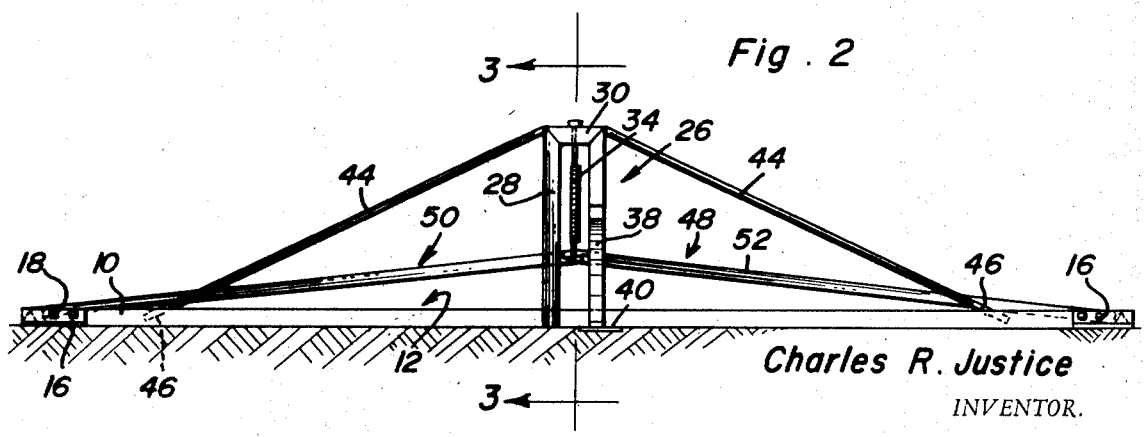
FIG. 2 is a view in side elevation of the structure illustrated in FIG. 1.

Referring first to FIGS. 1 and 2 it will be seen that the foundation means comprises a base frame which is preferably rectangular in plan and comprises a pair of duplicate coplanar longitudinal angle irons 10 which constitute the side rails or sills of the over-all base frame 12. The horizontal flanges are turned inwardly toward each other and the end portions thereof serve as adequate supporting ledges for the complemental inverted V-shaped irons 14. The latter irons constitute the end rails and adequately join the complemental side rails. The respective exterior corner portions of the frame are each provided with an outstanding surface-engaging rest 16. As shown in FIG. 7 each rest is a short section of an angle iron and is bolted in place on the vertical flange of the main angle iron as denoted at 18 in FIG. 7. These corner rests or brackets broaden the surface and facilitate supporting the over-all base flange when it is installed. With reference to FIG. 4 it will be noted that the inwardly downwardly inclined flange 20 of each end rail 14 is provided with hinge knuckles 22 for a hinge pintle 24 which will be referred to at a significant point in the description. Continuing with the base frame it will be noted that intermediate portions of the respective side rails are employed to position and sustain the post-like uprights in opposed relationship. These uprights are the same in construction and a description of one will suffice for both. Each post or upright is denoted by the numeral 26 and is of inverted vertically elongated U-shaped form. The vertical legs 28 have their lower ends anchored in the seat provided therefor in the manner shown in FIG. 3. The bight portion at the upper end of the upright is denoted at 30 and is provided with an eye-bolt or the like 32 which suspends an appropriately tensioned coil spring 34. As shown in FIG. 5 the lowermost coil or convolution of the coil spring is provided with a hanger hook 36. To insure stability the upright is provided with an exterior outwardly and downwardly inclined or diagonal brace 38 (FIG. 3) having a lower end anchored on an adapter 40 which is bracketed in place in the manner shown at 42. Further stability is provided by using outwardly and downwardly inclined guy-rods 44. These rods as shown in FIG. 2 have their upper ends connected to the upper end portion of the post or upright and their lower ends 46 anchored on the outer end portions of the side rails as shown.

This thus constructed base frame and spring-equipped post serve to accommodatingly anchor and support the two vehicle-operated grate-type gates one of which is denoted generally at 48 and the other one (the one to the left in FIG. 1) by the numeral 50. These gates are dimensioned so that the outer ends can be hinged as shown in FIG. 4 and the inner ends positioned between the cooperating uprights 26 in a manner to swing through required arcuate paths as is evident, it is believed, from FIG. 2. Each gate is the same in construction and comprises a substantially U-shaped marginal frame comprising opposed angle irons 52 joined by an intervening angle iron 54 (FIG. 4). The inward free end portions of the side angle irons 52 serve to support a relatively large main tube or pipe 56. The complemental auxiliary pipes or rods 58 are also supported between the angle irons 52 with their end portions properly anchored and these pipes are in spaced parallel relationship and are further provided with reinforcing strap irons 60 (FIG. 1). With reference again to FIG. 4 the hinge means embodies a third hinge knuckle 62 which is arranged between the knuckles 22 and which is assembled and held in place by the pintle 24 which is threaded through the several knuckles. Thus the outward end portions of the respective gates are freely hinged and the inner end portions are normally in an elevated position. To achieve the result desired the gate 48 (FIG. 5) is provided with an outstanding stud 64 which is cradled in the hanger hook 36. There is a companion equilizing plate or cleat provided at 66 and this is welded in place and disposed at an oblique angle so that an end portion 68 projects to the point desired and rests upon the stud 64. With this construction it will be evident that the gates are simultaneously liftable and lowerable. The spring means 34 permits the gates to swing down to level position when a vehicle passes thereover in either direction.

It will be noted that the actuating cleat 66 with its edge or end 68 fulcrumed on the stud 64 is shown at one side of the structure only. On the other corresponding side the stud and actuator cleat would be reversed (not shown) to achieve the simultaneous lowering of the two gates 48 and 50 to assume a level position when a vehicle is driven over the gates. The springs 34 on their respective posts 26 are tensioned to automatically and simultaneously lift the gates up to assume their normal "cattle guard" position and relationship.

It will be evident that a structure of the type herein shown and described comprises simple, economical and practical component parts which can be mass-produced and subsequently assembled to provide a ready-to-install device, one which is self-contained and portable and lends itself to practical adoption and use in cattle country. All of the component parts are above ground and accessible and capable of being repeatedly checked and replaced or otherwise repaired. Accordingly, it is believed that the gate herein shown and described well serves the purposes for which the invention is adaptably usable. A more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable vehicle operated gate comprising a horizontally elongated base frame rectangular in plan embodying a pair of spaced parallel coplanar longitudinal inwardly and upwardly opening angle irons constituting companion side rails, a pair of inverted V-shaped irons each bridging the space between coacting terminal ends of said angle irons and resting atop inwardly disposed horizontal flanges of the respectively cooperable side rails and secured thereto and providing a pair of coplanar transverse end rails, a pair of like inverted vertically elongated U-shaped uprights, each including a pair of spaced parallel vertical angle irons which provide legs and have lower ends aligned with and fixed to median portions of the horizontal flanges of the respectively cooperable side rails, said uprights being individually stabilized by guy-rods disposed in a common plane and joined at upper ends to a top portion of the respective uprights and having lower ends fixed to coacting outer end portions of the respectively cooperable side rails, each upright having a coil spring operatively depending between cooperating vertical legs and terminating at a lower end in a hanger hook, and a pair of like openwork gates overlying and in alignment with underlying portions of said frame and having outer ends proximal to and hingedly mounted on the respectively cooperable end rails and having inward free ends located adjacent and confronting each other and terminating in alignment with the space existing between the respectively cooperable uprights, at least one of the side members of one of said gates having an outstanding stud aligned with and lodged and cradled in the aligned hanger hook, the other one of said gates having a fixedly mounted gate depressing and actuating cleat having a terminal end portion projecting beyond the coordinating gate and resting and tiltably fulcrumed on said stud, said hook being accessibly and releasably connected with said stud, each gate embodying a frame having coplanar interconnected longitudinal angle irons, a plurality of coplanar spaced parallel pipes spanning and disposed at right angles to and fixed on coordinating longitudinal angle irons, the outwardly disposed transverse angle irons of said gates being parallel with coacting V-shaped irons and being hingedly joined by hinge-pin-connected knuckles to adjacent top surfaces of the inward flanges on said V-shaped irons, the upper portions of the legs of said uprights projecting to a height above the uppermost level of the inward ends of said gates, each coil spring being coordinated with and generally commensurate in length with the height of the coacting upper portions of said legs and being adjustably and detachably suspended by means hung from the upper end of said upright.

2. The vehicle operated gate defined in and according to claim 1, and wherein said means comprises a vertically hung eye-bolt, the upper end of the spring having a terminal hook separably connected with the eye of said eye-bolt.

References Cited

UNITED STATES PATENTS

| 1,259,581 | 3/1918 | Zorn | 49—132 X |
| 1,714,820 | 5/1929 | Rounsborg et al. | 49—131 |
| 2,024,063 | 12/1935 | Roper | 49—131 |
| 3,256,637 | 6/1966 | Torrey | 49—131 |
| 3,089,267 | 5/1963 | Wooden | 49—131 |
| 3,296,741 | 1/1967 | Lubmann | 49—131 |

FOREIGN PATENTS 764,528   12/1956   Great Britain.

DENNIS L. TAYLOR, Primary Examiner